United States Patent

[11] 3,618,086

| [72] | Inventors | Cornelis Augustinus van Staaden;<br>Hendrik Teunis Huele, both of Hengelo,<br>Netherlands |
|---|---|---|
| [21] | Appl. No. | 865,609 |
| [22] | Filed | Oct. 13, 1969 |
| [45] | Patented | Nov. 2, 1971 |
| [73] | Assignee | N. V. Hollandse Signaalapparaten<br>Hengelo (O), Netherlands |
| [32] | Priority | Oct. 18, 1968 |
| [33] | | Netherlands |
| [31] | | 6814911 |

[54] RADAR SYSTEM FOR THREE-DIMENSIONAL TARGET POSITION INDICATION
7 Claims, 3 Drawing Figs.

[52] U.S. Cl. ................................................. 343/7.5, 343/7 A
[51] Int. Cl. ............................................... G01s 9/02
[50] Field of Search ................................... 343/7 A, 7.5

[56] References Cited
UNITED STATES PATENTS
3,223,996  12/1965  Voles ........................... 343/7 A

*Primary Examiner*—T. H. Tubbesing
*Attorney*—Frank R. Trifari

ABSTRACT: A radar system for three-dimensional target position indication, comprising on the one hand an antenna radiating a beam, wide in elevation, and on the other hand a frequency-dependent antenna radiating a pencil beam. The scanning plane of the second antenna is substantially coplanar to the beam plane of the first antenna. Furthermore, the system is provided with a device, which in response to given target signals received by means of the first antenna releases the transmitter of the second antenna to perform a scan during each pulse transmitted in the beam plane of said first antenna.

PATENTED NOV 2 1971                              3,618,086

INVENTORS
CORNELIS A. VAN STAADEN
HENDRIK T. HUELE

BY

AGENT

RADAR SYSTEM FOR THREE-DIMENSIONAL TARGET POSITION INDICATION

The following is a full, clear and exact disclosure of the nature of the said invention and of the best mode of realizing the advantages thereof.

The invention relates to a radar system for three-dimensional target position indication comprising a continuously operating first transceiver device and an associated antenna rotating continuously about a substantially vertical axis and radiating only a wide beam in the direction perpendicular to the plane of rotation for determining a first angular coordinate and the range and a second transceiver device with associated antenna rotating synchronously with said first antenna and radiating a narrow pencil beam which can be electronically controlled in the direction perpendicular to the plane of rotation for determining a second angular coordinate of a target detected by the first transceiver device.

Radar systems of this kind are known, for example, from the U.S. Pat. No. 3,328,797 and have specific disadvantages which restrict the possibilities of use. Such types of radar systems have, for example, the drawback that conflicting requirements have to be satisfied, since on the one hand the radar antennae have to rotate rapidly in order to attain the required information density, whereas on the other hand they have to rotate slowly in order to keep the shadow sector occurring after each scanning stroke performed by the second antenna within reasonable limits. A shadow sector appears when, during an elevation sweep by the second antenna, said antenna rotates at a comparatively high velocity around the substantially vertical axis; then, the beam does not describe a vertical stroke in space. Consequently part of space is not scanned at all by the second antenna. Moreover, the antennae to be employed in these radar systems are comparatively large and heavy, whilst under given conditions, particularly when used on board ships they have to be stabilized, which involves a considerable increase in weight.

The invention has for its object to provide a radar system of the kind set forth, which allows a particularly advantageous compromise for satisfying the aforesaid conflicting requirements and avoids the necessity of stabilizing the antenna system under all conditions.

According to the invention the two antennae of such a radar system are relatively arranged so that the antenna scanning plane of the second antenna is substantially coplanar to the beam plane of the first antenna, whilst further a device is provided, which, in response to a target signal received by means of the first transceiver device, releases the transmitter of the second transceiver device to perform a scan in the beam plane of said first antenna per pulse transmitted.

The invention and its advantages will be described more fully with reference to the figures.

Although for a satisfactory operation of the radar system in accordance with the invention it is not all essential for the antenna plane of rotation to be constantly in the horizontal position, it will be assumed for the sake of simplicity in the following description that the plane of rotation of the antenna is horizontal, since the antenna rotation is performed in azimuth and the scan in elevation and the angular coordinates may thus be referred to by the conventional terms azimuth and elevation.

It should be noted, however, that if the antennae are not stabilized on board ships, the measured azimuth and elevation show a deviation depending upon the instantaneous pitch and roll angle of the ship with respect to the real azimuth and elevation, however, without affecting the operation to be described hereinafter. For any further processing of the target data the real azimuth and elevation can be found by corrective calculation.

Figure 1:
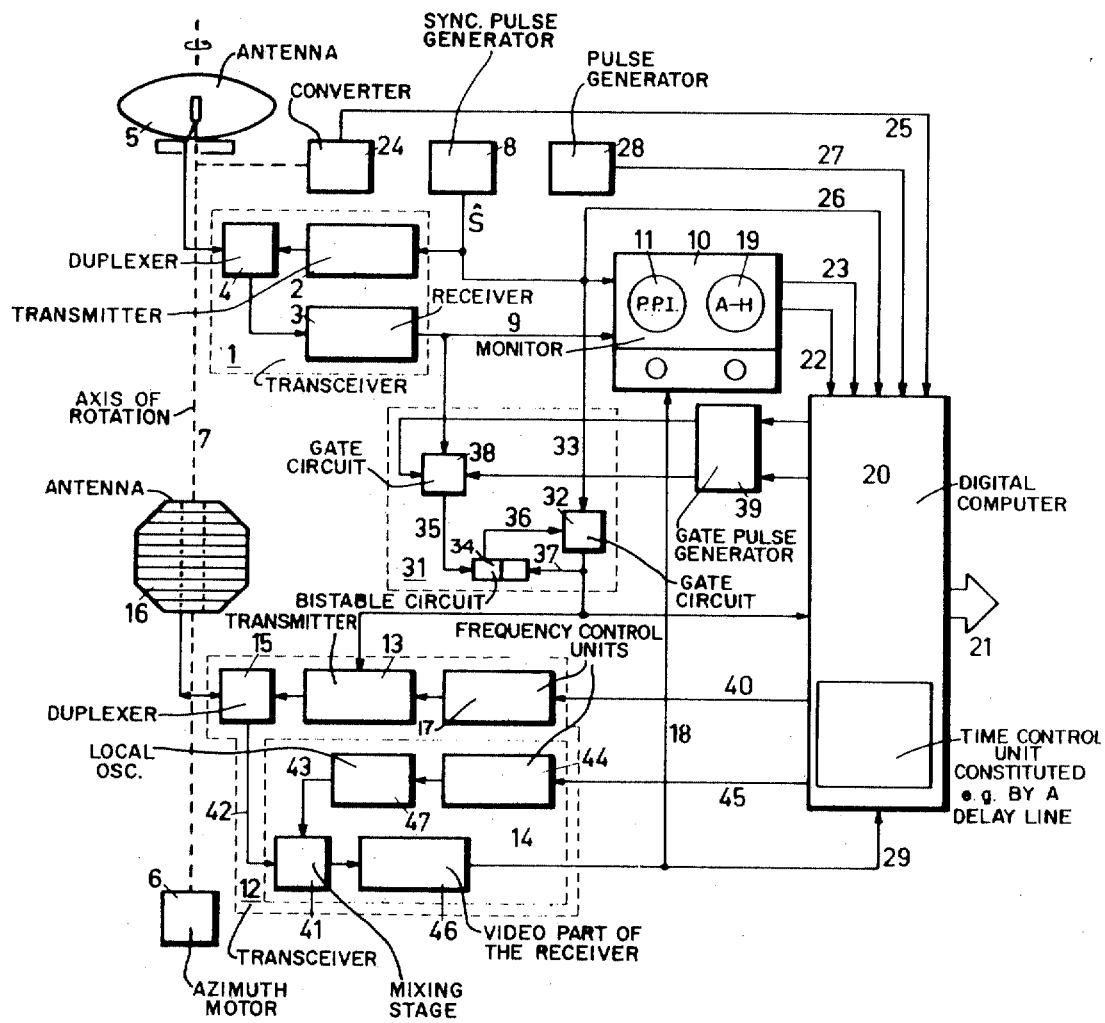
FIG. 1 is a block diagram of the radar system according to the invention.

In the embodiment shown in FIG. 1 reference numeral 1 represents a first transceiver device whose transmitter 2 and receiver 3 are coupled via a duplexer with an associated antenna 5. The construction of this antenna is such that the transmitting-receiving pattern in elevation is concentrated only weakly and corresponds, for example, with a fan-shaped or $cosec^2$-shaped pattern. Driven by azimuth motor 6 this antenna rotates continuously about an axis of rotation 7, whilst it is fed by output pulses of transmitter 2. This transmitter is controlled by synchronizing pulses $\bar{S}$ produced by sync pulse generator 8. The first transceiver device thus constantly scans space with a rotating beam, wide in elevation, whilst the targets located within the measuring range reflect part of the transmitted energy. The video signals appearing at the output of receiver 3 are applied, upon detection of these target echoes, through conductor 9 to a monitor 10 having a plan-position indicator 11 to visually display the azimuth and range of said targets.

The system comprises furthermore a second transceiver 12 whose transmitter 13 and receiver 14 are coupled through a duplexer 15 with the associated antenna 16, radiating a narrow pencil beam and which rotates synchronously in azimuth with the antenna 5. In order to determine the elevation of the target detected by means of the first transceiver device 1 said antenna 16, radiating a narrow pencil beam, can be electronically controlled in elevation. In the embodiment shown in FIG. 1 this antenna is constructed for this purpose as a frequency-dependent antenna which is formed, as schematically shown in the FIG., by a number of slot radiators assembled to form a sheet (planar array antenna), which are fed via a dispersive supply line arranged on the rear side of said sheet and therefore not shown in the FIG. As is known the beam exit angle of this kind of antennae varies with the carrier frequency of the pulse energy supplied to the antenna. In order to produce the frequencies required for a scan transmitter 13, coupled with antenna 16, comprises a frequency control unit 17 consisting of a set of crystal oscillators, gate circuits, amplifiers, mixing stages, frequency multipliers, modulators, etc. by means of which a number of equidistant frequencies are produced. The video signals appearing at the output of receiver 14 during such a scan are applied through conductor 18 to said monitor 10, which is provided with an A-H screen 19 for visually displaying said elevation.

Apart from said monitor for displaying the angular and range information, the embodiment shown comprises an electronic, digital computer 20 comprising the conventional arithmetic, storage and control units and coordinating the functions of the first and second transceiver devices and serving also for supplying at output 21 digitized angle and range information of specific targets selected in the embodiment shown in the first place by means of the monitor. The monitor is provided for this purpose with known means for selecting, by means of a cursor, targets indicated on the plan-position indicator whose azimuth and range are fed in digital form to the computer through conductors 22 and 23. The targets thus selected are written in azimuth sequence in the storage of the computer. Furthermore, the computer continuously records the instantaneous antenna azimuth with the aid of counting pulses. These counting pulses are supplied by a converter 24 coupled with antenna rotation shaft 7 and fed to the computer through conductor 25. The sync pulses $\bar{S}$ produced by sync pulse generator 8 and range-counting pulses produced by a pulse generator 28, are also fed to the computer through conductor 26 and 27, respectively. The computer coordinates and correlates the various functions of the system, in order to obtain the three coordinates of each one of, for example, hundred targets within the scope of the system. It is arranged for processing a great number of data on a "real-time" basis. Since any "general purpose" digital computer is suitable to perform the various tasks at adequate speed, the design of this computer need not be explained further, also because this is not necessary for a good understanding of the invention.

According to the invention a particularly advantageous radar system for three-dimensional position indication is obtained by arranging the two antennae 5, 16 relatively to each other so that the scanning plane of the second antenna 16 is substantially coplanar to the beam plane of the first antenna 5 and by providing furthermore a device 31, which, in response to given target signals received by means of the first transceiver device 1, releases the transmitter 13 of the second transceiver device 12, to perform a scan in the beam plane of said first antenna per each pulse transmitted.

In the embodiment shown the scan performed per each pulse transmitted is obtained by a stepwise variation of the carrier frequency of the transmitter pulse. With regard to the flexibility of the system it is advantageous to have the frequency control unit 17 controlled by the computer 20 when transmitter 13 is released. For this purpose the computer comprises a program, the consecutive instructions of which ensure that the carrier frequency of the transmitter pulse supplied by transmitter 13 is varied stepwise in frequency so that the beam emitted by antenna 16 performs the desired scan within the duration of the transmitter pulse.

The stepwise variation of the transmitter carrier frequency may be such that the beam exit angle increases or decreases per frequency step by 1 beamwidth of, for example 1.5° and remains constant for a duration of, for example 2 $\mu$sec.

In the embodiment shown, device 31 comprises a first gate circuit 32, included in a connecting line 33, between the output of sync pulse generator 8 and an input of transmitter 13 on the one hand and an input of the computer 20 on the other hand, when said gate circuit is conducting. Said first gate circuit 32 is controlled via a bistable circuit 34 by video signals appearing at the output of receiver 3 and applied to said bistable circuit through conductor 35. This bistable circuit is normally in a first state of equilibrium, whereby gate circuit 32 interrupts connecting line 33. When a video signal from receiver 3 is applied through conductor 35, this bistable circuit changes over to its other state of equilibrium, in which gate circuit 32 is opened through conductor 36. The next sync pulse appearing at the output of sync pulse generator 8 is then applied through gate circuit 32 to transmitter 13 and the computer 20. Via conductor 37 this passed sync pulse is also fed as a resetting pulse to the bistable circuit causing it to return to its initial state of equilibrium, in which the gate circuit is closed. In order to prevent the bistable circuit from responding to interference signals received by receiver 3 or to target signals whose angle and range information has not yet been introduced into the computer, conductor 35 is normally interrupted by a second gate circuit 38. This second gate circuit is controlled by azimuth and range gate pulses which are supplied by a gate pulse generator 39. This gate pulse generator is controlled by the computer depending upon the instantaneous antenna azimuth and the positions predicted by the computer of those targets whose angle and range information has been introduced into the computer.

Gate pulse generator circuits controlled by means of a computer for producing azimuth and range gate pulses for each of the targets consecutively scanned per antenna rotation are known in various embodiments. A particularly advantageous embodiment of such a gate pulse system is described, for example in the U.S. Pat. No. 3,403,396.

Each of the sync pulses passed by gate circuit 32 triggers transmitter 13 and also causes the computer 20 to perform its program whose instructions consecutively supplied to the frequency control unit cause the carrier frequency of the transmitter pulse produced by transmitter 13 to be stepwise varied in frequency so that the scan is performed.

Since each scan depends upon a video signal appearing at the output of receiver 3 and since each target supplies per antenna rotation at least a plurality of video signals, a plurality of scans are obviously performed for each target. Theoretically each scan performed by antenna 16 will provide at least one target echo, since it is performed in the beam plane of antenna 5. The carrier frequency of the echo depends of course upon the height of the target. The receiver of transceiver device 12 must therefore be suitable for the selective reception of echo signals of different carrier frequencies. In fact this requires a receiver having a plurality of separate receiving channels. In the embodiment shown such an expensive receiver has, however, been avoided. The design of receiver 14 is based on the recognition that scans are exclusively performed with respect to targets whose range has been determined with the aid of the first transceiver device and is therefore known to the computer so that a fixed intermediate frequency can be employed provided the then required stepwise frequency variation of the local oscillator signal is started with the aid of a time control unit 48 depending upon the target range.

For this purpose receiver 14 comprises a mixing stage 41 to which the echo signals received by antenna 16 are fed through conductor 42 and a local oscillator signal varying stepwise in frequency via conductor 43. The latter signal is derived from a local oscillator 47 controlled by a frequency control unit 44. The frequency control unit 44, like frequency control unit 17, is so constructed that it can supply a sequence of equidistant frequencies. The sequences of equidistant frequencies supplied by the two frequency control units 17 and 44 have a frequency difference equal to the receiver intermediate frequency. The frequency control unit 44 is controlled through conductor 45 by said time control unit 48, which forms part of the computer 20 in this embodiment, said computer being for this purpose provided with a program whose consecutive instructions cause the signal supplied by the frequency control unit 44 and the local oscillator 47 to have the correct stepwise frequency variation. The sequence of instructions supplied through conductor 45 to frequency control unit 44 starts at the instant determined by the time control unit, when the echo of the relevant target appears, it being assumed that the target height is equal to zero. When the height of the relevant target is in fact equal to zero, mixing stage 41 supplies the intermediate frequency output signal for the time in which the local oscillator signal is determined by the first instruction of the sequence of instructions supplied to the frequency control unit. Accordingly as the target concerned is at a greater height, the intermediate frequency signal supplied by the mixing stage will occur during instructions supplied at correspondingly later instants to frequency control unit 44. The intermediate frequency signal appearing at the output of mixing stage 41 is converted in video part 46 of receiver 14 into a video signal which in this embodiment is fed to the computer 20 via conductor 29. The computer comprises a counter recording the number of instructions supplied to frequency control unit 44 during each scan. It will be obvious that the position of this counter at the instant a video signal is fed to the computer through conductor 29 is indirectly a measure for the height of the target, since the beam exit angle of the beam emitted by the antenna 16 increases by a fixed angular value for each instruction supplied to frequency control unit 44.

Figure 2:
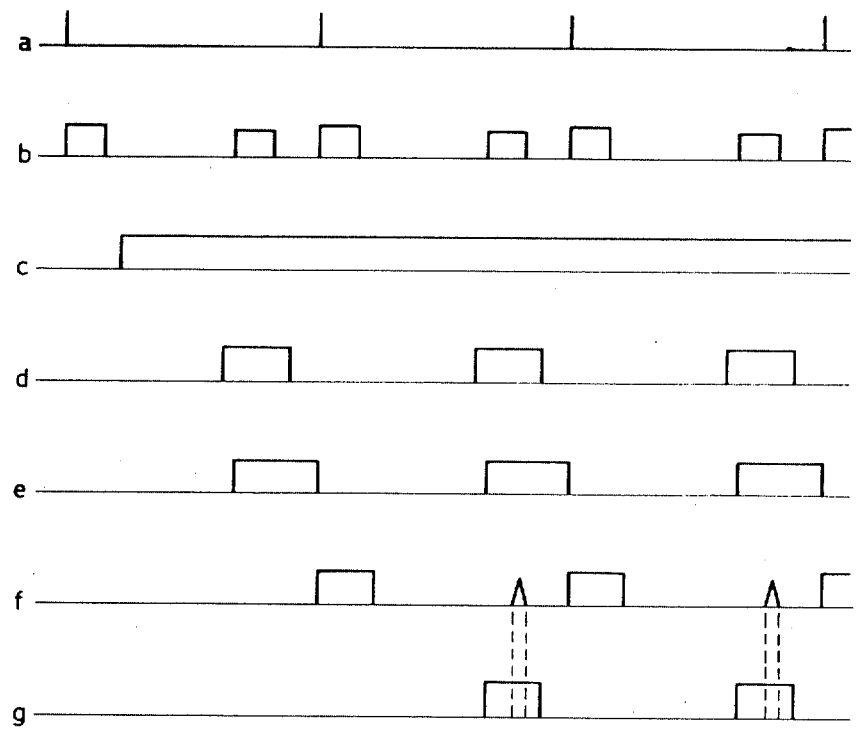
FIGS. 2 and 3 show a number of time diagrams explaining the operation of the radar system according to FIG. 1.

To illustrate a few time relations occurring in the radar system described above waveforms a to g in FIG. 2 show a few time diagrams. Waveform a of FIG. 2 shows a number of sync pulses $\hat{S}$ supplied by sync pulse generator 8. Waveform b of FIG. 2 shows the transmitter pulses supplied by transmitter 2 as a result of said sync pulses and the video signals supplied by receiver 3 in the respective transmitter pulse repetition intervals all relating to one and the same target. Waveform c of FIG. 2 shows part of the azimuth gate pulses applied to gate circuit 38 and waveform d of FIG. 2 shows the range gate pulses supplied to said gate circuit. These azimuth and range gate pulses cause the incoming video signals to be passed by gate circuit 38. Each of said passed video signals opens gate circuit 32 via bistable circuit 34 until the next $\hat{S}$-pulse has been passed. Waveform e of FIG. 2 shows the output signal of the bistable circuit 34 fed to gate circuit 32 through conductor 36. Each of the sync pulses $\hat{S}$ passed by gate circuit 32 causes transmitter 13 to be released for the duration of a transmitted pulse and causes the computer to pass the number of instructions required for one scan to the frequency control unit 17. Waveform f of FIG. 2 shows the transmitter pulses supplied by transmitter 13 and the echoes received during the scan. Waveform g of FIG. 2 shows the instants at which the frequency-varying local oscillator signal is applied to mixing stage 41.

Figure 3:
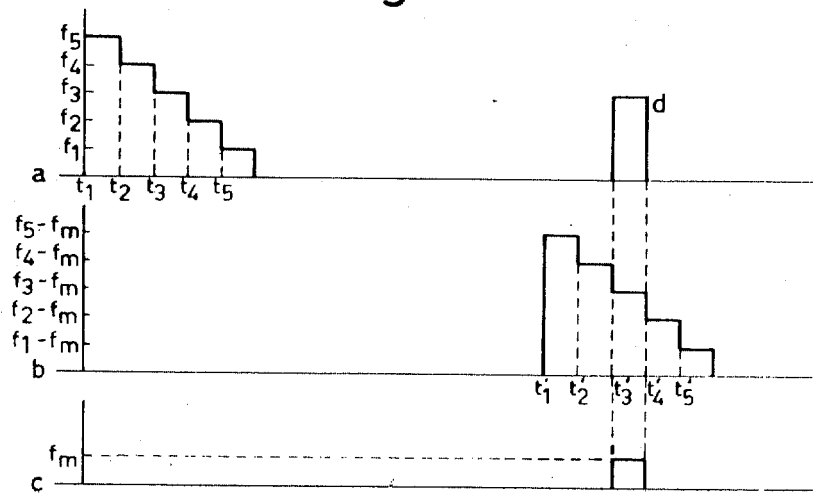

In diagram $a$ of FIG. 3 the stepwise frequency variation of the carrier frequency of a pulse transmitted by transmitter 13 is plotted against time. The echo received during the scan is indicated in diagram $a$ of FIG. 3 by $d$. It is assumed that the target is at such an elevation that the carrier frequency of the echo received is equal to the frequency $f_3$. In diagram $b$ of FIG. 3 the stepwise frequency variation of the local oscillator signal is plotted against time. The instant $t_1'$ at which this local oscillator signal is started is calculated by the computer on the basis of the predicted target range. At the instant when the target echo with carrier frequency $f_3$ is fed to mixing stage 41 the frequency of the local oscillator signal, as is shown in the FIG., is equal to $f_3-f_m$, so that the signal appearing at the output of mixing stage 41 is equal to intermediate frequency signal $f_m$ which signal is indicated in diagram $c$ of FIG. 3.

After the three-dimensional position of a target has been determined in the manner described above, the position of such a target can be accurately recorded by performing a crosswise position-measuring scan per antenna rotation with respect to such a target as described in detail in said U.S. Pat. No. 3,328,797.

Since in the radar system according to the invention the scan is performed when the pulse is transmitted and always takes place in the beam plane of the first antenna 5, the axis of rotation of the antennae need not be vertical. This means that on board ships the antennae need not be stabilized. By supplying the instantaneous pitch and roll angles determined by means of a gyroscopic system to the computer, the measured azimuth and elevation can be corrected to obtain the real azimuth and elevation.

It should finally be noted that the time control device for starting the stepwise varying local oscillator signal depending upon the target range need not at all form part of the computer but may be formed by a delay line fed by the target signals appearing at the output of the receiver of the first transceiver device, said line introducing a delay equal to one pulse repetition period.

What we claim is:

1. A radar system for three-dimensional target position indication comprising a continuously operating first transceiver device and an associated antenna rotating continuously about a substantially vertical axis and radiating only a wide beam in the direction perpendicular to the plane of rotation for determining a first angular coordinate and the range and a second transceiver device with associated antenna rotating synchronously with the first antenna and radiating a narrow pencil beam which can be electronically controlled in the direction perpendicular to the plane of rotation for determining a second angular coordinate of a target detected by the first transceiver device, wherein the two antennae are relatively arranged so that the scanning plane of the second antenna is substantially coplanar to the beam plane of the first antenna and in that there is furthermore provided a device which, in response to given target signals received by means of the first transceiver device, releases the transmitter of the second transceiver device to perform a scan during each pulse transmitted in the beam plane of said first antenna.

2. A radar system as claimed in claim 1, wherein said releasing device comprises at least one normally closed gate circuit and a bistable circuit, the latter responding to each of the target signals received with the aid of the receiver of said first transceiver device by opening said gate circuit for such a time that the next sync pulse for controlling the transmitter of said first transceiver device also releases the transmitter of said second transceiver device.

3. A radar system as claimed in claim 1 wherein said releasing device comprises a second gate circuit controlled by azimuth and range gates, through which second gate circuit the target signals received by the receiver of said first transceiver device are fed to the input of the bistable circuit.

4. A radar system as claimed in claim 1, with said second antenna constructed as a frequency-dependent antenna, wherein the transceiver in conjunction with this antenna consists of a transmitter feeding upon release a transmitter pulse whose carrier varies stepwise in frequency, to said frequency-dependent antenna, and a receiver provided with a mixing stage to which on the one hand the receiver target signals are fed and on the other hand a local oscillator signal varying stepwise in frequency with the stepwise frequency variation of the transmitter output pulse, and of a time control unit for automatically setting the starting time of the local oscillator signal depending upon the target range established by means of the first transceiver.

5. A radar system as claimed in claim 4, wherein said time control unit is constituted by a delay line fed by the target signals appearing at the output of the receiver of said first transceiver, said delay line introducing a delay equal to one pulse repetition period.

6. A radar system as claimed in claim 4, wherein the time control unit is part of a digital computer coordinating the functions of the first and the second transceiver.

7. A radar system as claimed in claim 4, wherein the frequency-dependent antenna consists of a large number of slot radiators constituting a planar array antenna to which the frequency-modulated pulses are fed via a dispersive supply line.

* * * * *